United States Patent
Ronlan

(10) Patent No.: US 10,513,155 B2
(45) Date of Patent: Dec. 24, 2019

(54) TIRE BALANCING COMPOSITIONS

(71) Applicant: Bertil Carnehammar, Zurich (CH)

(72) Inventor: Alvin Ronlan, Stockholm (SE)

(73) Assignee: Bertil Carnehammar, Zurich (CH)

( * ) Notice: Subject to any disclaimer, the term of this patent is extended or adjusted under 35 U.S.C. 154(b) by 147 days.

(21) Appl. No.: 15/236,428

(22) Filed: Aug. 13, 2016

(65) Prior Publication Data

US 2016/0347128 A1 Dec. 1, 2016

Related U.S. Application Data

(63) Continuation of application No. 13/126,693, filed as application No. PCT/EP2009/065058 on Nov. 12, 2009, now Pat. No. 9,421,723.

(30) Foreign Application Priority Data

Nov. 12, 2008 (EP) ..................................... 08168913

(51) Int. Cl.
*B60C 19/00* (2006.01)
*B60C 1/00* (2006.01)
(Continued)

(52) U.S. Cl.
CPC ......... *B60C 19/003* (2013.01); *B01J 13/0065* (2013.01); *B29D 30/0633* (2013.01);
(Continued)

(58) Field of Classification Search
CPC ......... B60C 1/00; B60C 17/10; B60C 17/106; B29D 30/0685
See application file for complete search history.

(56) References Cited

U.S. PATENT DOCUMENTS 2,673,838 A 3/1954 Franklin et al.
3,463,551 A 8/1969 Clay
(Continued)

FOREIGN PATENT DOCUMENTS

| EP | 1063106 A1 | 12/2000 |
|---|---|---|
| GB | 1209696 A | 10/1970 |
| JP | 2003056074 A | 2/2003 |

*Primary Examiner* — Justin R Fischer
(74) *Attorney, Agent, or Firm* — Robert S. Lelkes

(57) ABSTRACT

Visco-elastic tyre balancing compositions comprising 1) 85 to 97% by weight of a glycol ether component comprising one or more ethylene/propylene glycol copolymer ethers of the general formula (I) or the general (II) or mixtures thereof $R-O\{[CH(CH_3)CH_2-O-]_m[CH_2-CH_2-O-]_n\}H$ (I) $R_1-(O-\{[CH(CH_3)CH_2-O-]_m[CH_2-CH_2-O-]_n\}H)_2$ (II) wherein R is hydrogen or an alkyl group of 2-8 carbon atoms; $R_1$ is an alkylene moiety of 2-8 carbon atoms in which the two substituents are not carried on the same carbon atom; m is the mole percentage of propylene glycol in the ethylene/propylene glycol copolymer moiety or moieties; and n is the mole percentage of ethylene glycol in the ethylene/propylene glycol copolymer moiety or moieties, wherein the ratio n:m is in the range from 35:65 to 80:20; each glycol copolymer compound having a number average molecular weight in the range of 2000-10000; and 2) 3 to 15% by weight of a fumed silica gel former; said balancing compositions being visco-elastic and having a Storage Modulus (G') between 1500 Pa and 5000 Pa at 22° C., a Loss Modulus (G") smaller than the Storage Modulus up to a Cross Over Frequency of 10-40 Hz, and a Critical Yield Stress exceeding 2 Pa.

9 Claims, 5 Drawing Sheets

Diagram of a tyre modified to achieve optimal balancing using the gels of this invention.

(51) Int. Cl.
*B29D 30/06* (2006.01)
*C08L 71/02* (2006.01)
*B01J 13/00* (2006.01)
*C08K 3/36* (2006.01)
*B29K 71/00* (2006.01)
*B29K 105/00* (2006.01)

(52) U.S. Cl.
CPC ............ *B60C 19/002* (2013.01); *C08L 71/02* (2013.01); *B29D 2030/0637* (2013.01); *B29K 2023/04* (2013.01); *B29K 2071/12* (2013.01); *B29K 2105/0085* (2013.01); *C08K 3/36* (2013.01)

(56) References Cited

U.S. PATENT DOCUMENTS

| | | | |
|---|---|---|---|
| 3,747,660 A | 7/1973 | Tibbals | |
| 3,779,723 A | 12/1973 | Fuller et al. | |
| 3,820,612 A * | 6/1974 | Snyder et al. | E21B 21/16 175/70 |
| 3,920,061 A | 11/1975 | Japp et al. | |
| 3,931,843 A * | 1/1976 | Edwards | B29D 30/0685 152/504 |
| 3,987,833 A | 10/1976 | Powell et al. | |
| 4,110,428 A * | 8/1978 | Kuhn | A61K 8/26 424/46 |
| 4,139,395 A | 2/1979 | Dunlap | |
| 4,304,281 A | 12/1981 | Kenney | |
| 4,867,792 A | 9/1989 | Ronlan | |
| 5,028,267 A | 7/1991 | Lane et al. | |
| 5,073,217 A | 12/1991 | Fogal | |
| 5,083,596 A | 1/1992 | Kato et al. | |
| 5,201,248 A | 4/1993 | Ibe et al. | |
| 5,427,707 A | 6/1995 | Drapier et al. | |
| 5,431,726 A | 7/1995 | Ronlan | |
| 5,540,767 A * | 7/1996 | Ronlan | B60C 5/004 106/243 |
| 5,639,296 A | 6/1997 | Garino | |
| 6,547,983 B2 | 4/2003 | Iyengar | |
| 7,368,024 B2 | 5/2008 | Majumdar et al. | |
| 7,846,881 B2 * | 12/2010 | Hotaling | B60C 17/10 508/136 |
| 8,215,349 B2 | 7/2012 | Seitz | |
| 2005/0159534 A1 | 7/2005 | Ronlan | |
| 2007/0044893 A1 | 3/2007 | Majumdar et al. | |
| 2009/0272471 A1 | 11/2009 | Bormann | |
| 2010/0006195 A1 | 1/2010 | Seitz | |
| 2010/0212811 A1 | 8/2010 | Seitz | |
| 2010/0252174 A1 | 10/2010 | Ronlan | |
| 2011/0162442 A1 | 7/2011 | Ronlan et al. | |
| 2011/0260522 A1 | 10/2011 | Bormann | |
| 2012/0222516 A1 | 9/2012 | Carnehammer et al. | |
| 2012/0252591 A1 | 10/2012 | Seitz et al. | |
| 2012/0260766 A1 | 10/2012 | Seitz | |

* cited by examiner

Fig. 1 Diagram of a tyre modified to achieve optimal balancing using the gels of this invention.

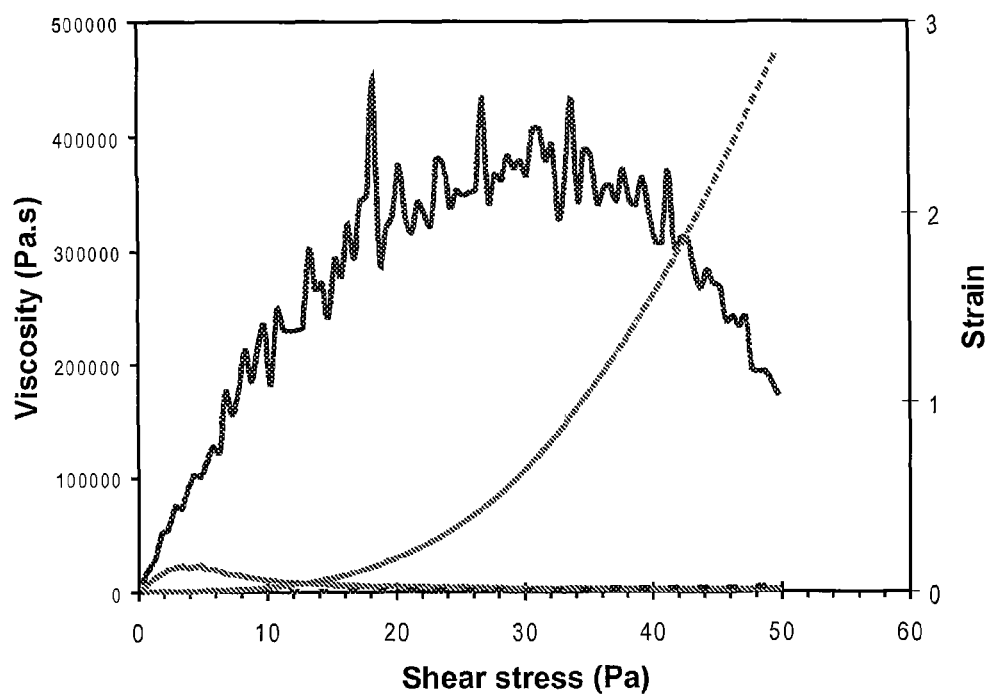
Figure 5: Yield stress determination: stress growth from 0.1 to 50 Pa.

TIRE BALANCING COMPOSITIONS

FIELD OF THE INVENTION

The present invention relates to improved visco-elastic, chemically inert gel compositions for use in eliminating imbalances in motor vehicle wheel assemblies, a method for preparation of such compositions as well as the use of such compositions.

BACKGROUND OF THE INVENTION

Vibrations in rolling wheel assemblies i.e. tyre+rim are caused by several, different types of tyre imperfections, the most important being
- Non-homogeneous mass distribution
- Stiffness variations
- Geometric variations
- Radial and lateral run out
- Eccentricity of the tyre Similar imperfections in the rim will also induce vibrations.

Vibrations in a truck or car wheel assembly due to imperfect tyres or rims cause vibrations which, apart from the discomfort to the driver and any passengers, can dramatically increase the tyre wear as well as mechanical wear. The present most common method for reducing wheel assembly derived vibration is still the attachment of metal weights to the tyre rim. However, this balancing technique, being of a static nature, cannot compensate for changes in load (i.e. deformation of the tyres), uneven wear of the tyres and the consequent changes in mass distribution, dirt collection on the rim, and the like. Consequently, balancing by means of metal weights must be repeated several times during the life time of a tyre.

The present invention is based on the fact that vibrations caused by imbalance in a wheel assembly can induce a motion in a liquid inside the tyre in a direction that will diminish the vibrations and the imbalance. However, to utilize this "vibrational pressure" to achieve balancing of a wheel assembly (i.e. that the gravitational centre is in the intersection between the rotational plane and the axis of rotation) is by no means trivial. If a mere free-flowing liquid such as water was introduced into a spinning tyre, any movement of this mass caused by a "vibrational pressure" would immediately be counteracted by the centrifugal force, which frequently exceeds 1000×g during normal driving, resulting in an oscillating movement of the liquid with no balancing effect.

These oscillations can be prevented/dampened sufficiently to achieve a balancing effect by using visco-elastic gels characterized by their critical yield stress and other rheological parameters.

U.S. Pat. No. 5,540,767, the content of which is hereby incorporated by reference, discloses visco-elastic tyre balancing compositions comprising (A) 80-95% w/w of an oil selected from i.a. polypropyleneglycol alkyl ethers, and (B) 4-15% w/w of a gel former selected from i.a. fumed silica having a BET surface in the range of from about 50 to about 400 m²/g.

The efficiency of these balancing gels can be demonstrated experimentally by measuring vertical accelerations on the spring leg of a front axle with its wheels running under load against a rotating drum.

SUMMARY OF THE INVENTION

The invention relates to improved visco-elastic tyre balancing compositions comprising 1) 85 to 97% by weight of a glycol ether component comprising one or more ethylene/propylene glycol copolymer ethers of the general formula (I) or the general (II) or mixtures thereof.

  (I)

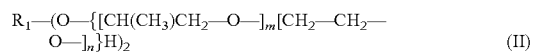  (II)

wherein
R is hydrogen or an alkyl group of 2-8 carbon atoms;
$R_1$ is an alkylene moiety of 2-8 carbon atoms in which the two substituents are not carried on the same carbon atom;
m is the mole percentage of propylene glycol in the ethylene/propylene glycol copolymer moiety or moieties; and
n is the mole percentage of ethylene glycol in the ethylene/propylene glycol copolymer moiety or moieties, wherein the ratio n:m is in the range from 35:65 to 80:20;
each glycol copolymer compound having a number average molecular weight in the range of 2000-10000;

and 2) 3 to 15% by weight of a fumed silica gel former;

said balancing composition being visco-elastic and having a Storage Modulus (G') between 1500 Pa and 5000 Pa at 22° C., a Loss Modulus (G") smaller than the Storage Modulus up to a Cross Over Frequency of 10-40 Hz, and a Critical Yield Stress exceeding 2 Pa.

Is has been found that compared with the pure polypropylene glycol alkyl ethers used in U.S. Pat. No. 5,540,767, the use according to the invention of ethylene/propylene glycol copolymer monoethers results in improved performance of tyre balancing compositions.

The invention further relates to an automobile tire containing within its air cavity a suitable amount of a balancing composition of the invention, and an automobile wheel assembly comprising a wheel rim and such a a tire, as well as a method for balancing a motor vehicle wheel assembly, comprising applying to the inner surface of the tire a balancing composition according to the invention, mounting the wheel assembly on a motor vehicle and driving the motor vehicle ford distance sufficient to allow the balancing composition to balance the wheel assembly.

BRIEF DESCRIPTION OF THE DRAWINGS

FIG. 5 shows a plot of viscosity (in Pa·a) and strain against shear stress (in Pa) in connection with determination of yield stress.

DETAILED DESCRIPTION OF THE INVENTION

Important rheological properties of the balancing composition are its Critical Yield Stress (CYS) and Elastic (Storage) Modulus, G', both measured in the linear visco-elastic region, as well as its Yield Stress as determined in stress growth measurements and the relationship between its storage modulus, G,' and its Loss Modulus, G", measured by a frequency sweep.

Figure 2:
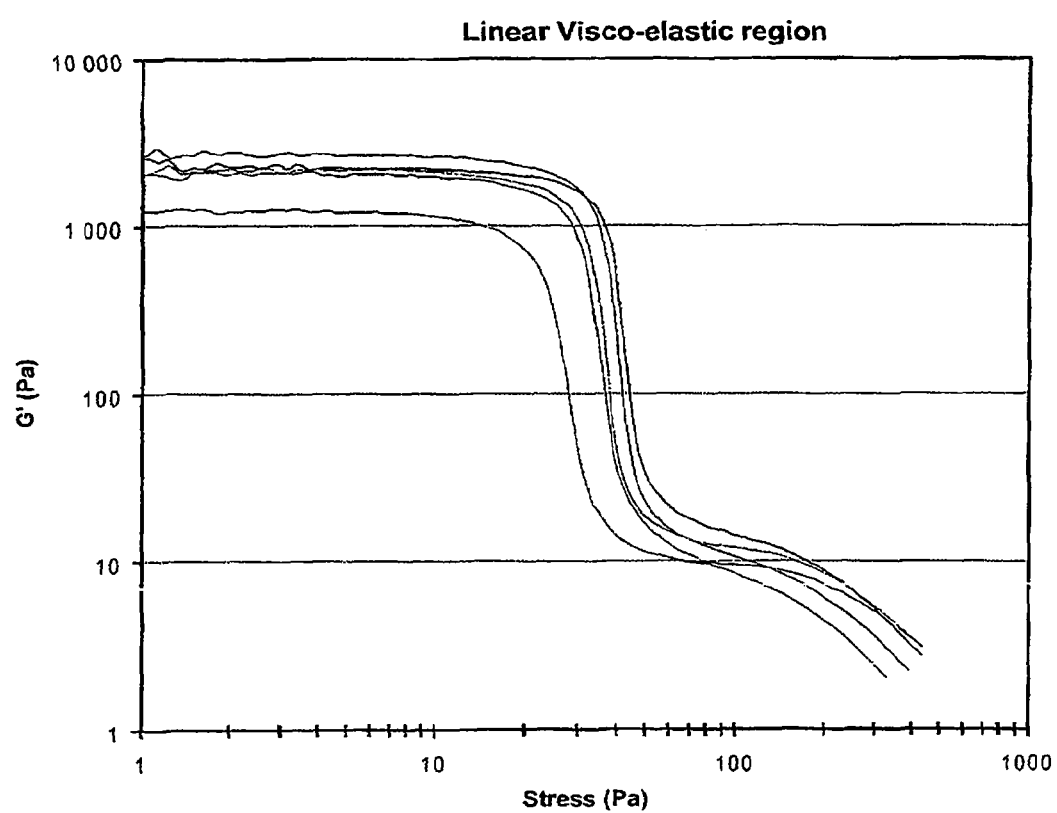
FIG. 2 shows a plot in the linear visco-elastic region (oscillation freq. 1 Hz, stress sweep 0.1-1000 Pa) of the Storage Modulus G' (in Pa) versus the stress (in Pa) for some balancing gel compositions of the invention described in Table 1.
Figure 3:
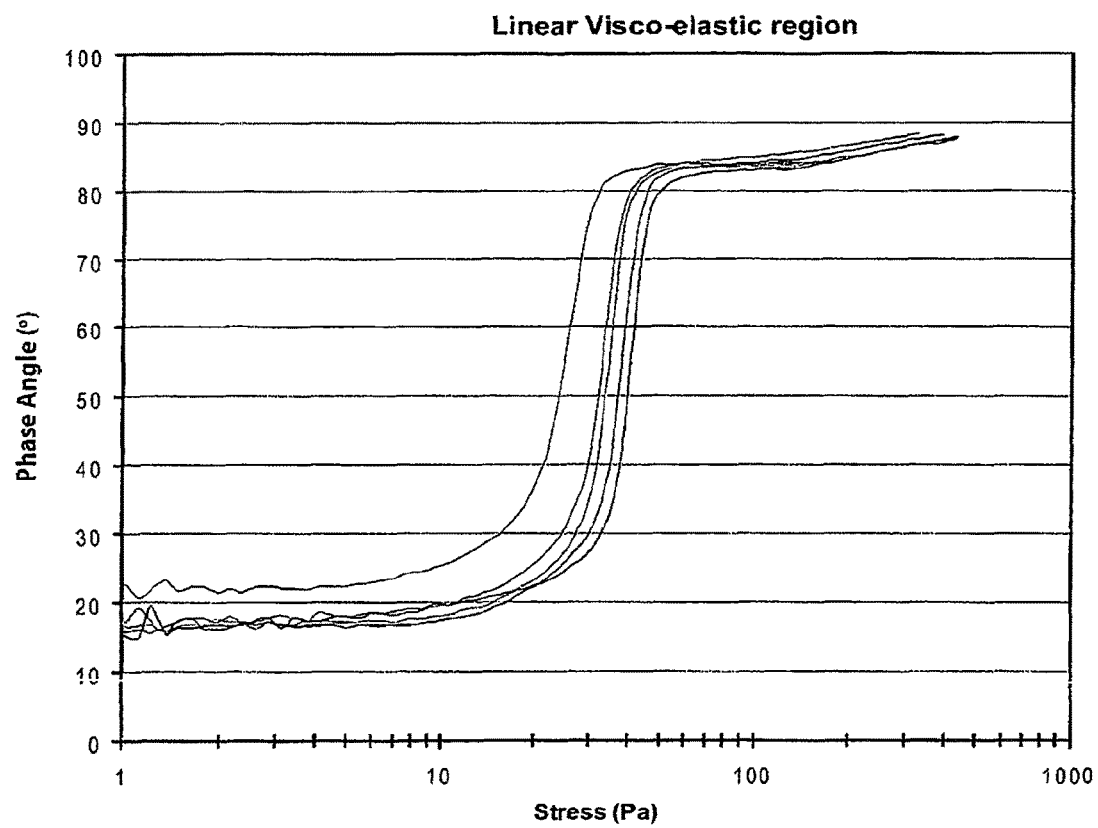
FIG. 3 shows a plot in the linear visco-elastic region (oscillation freq. 1 Hz, stress sweep 0.1-1000 Pa) of the Phase Angle (in degrees (°)) versus the stress (in Pa) for some balancing gel compositions of the invention described in Table 1.

G' is a measure of the strength of the gel, that is the strength and the number of bonds between the molecules of the gel former. I have found that in order to 1500 to 5000 Pa and the Critical Yield Stress should be in the range 5-30 Pa. Stress sweep of a series of functional balancing gels is shown in FIGS. 2 and 3. A very satisfactory balancing composition has a value of G' around 2000 Pa and a Critical Yield Stress around 18 Pa.

G" is a measure of a material's ability to dissipate energy in the form of heat.

Figure 4:
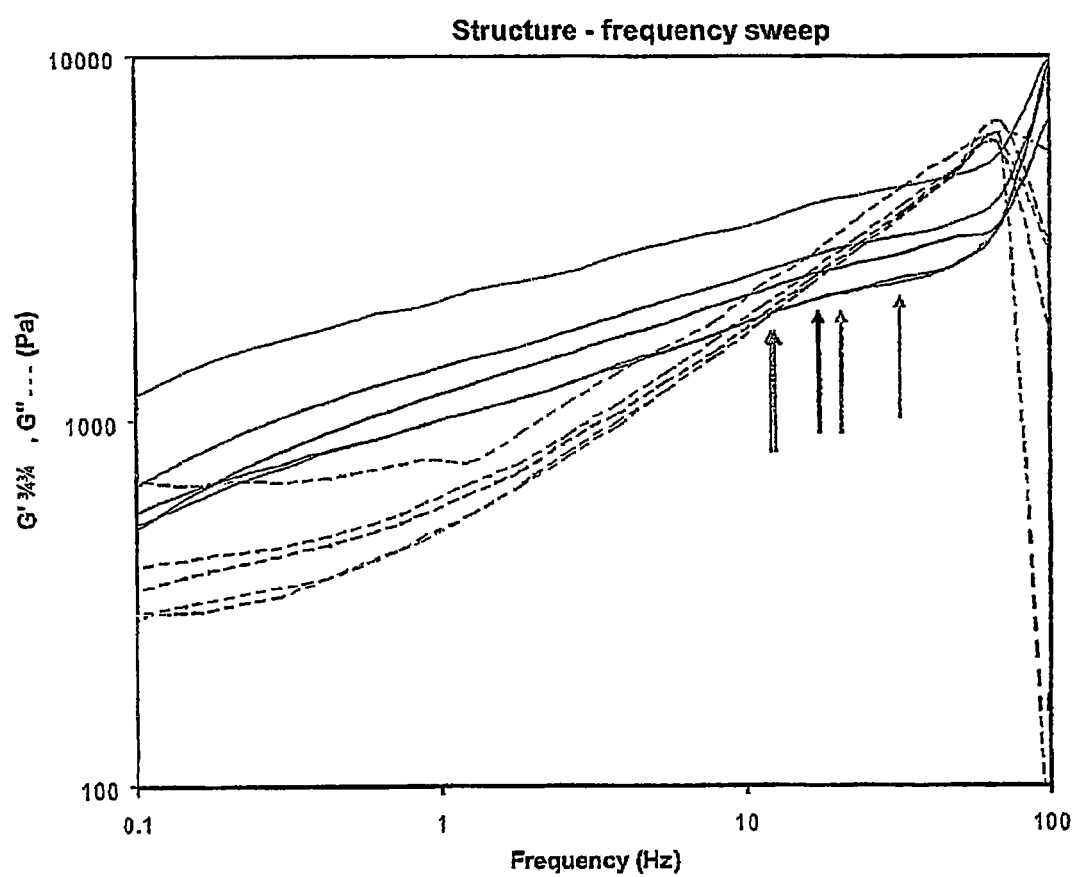
FIG. 4 shows a plot of the Slut aye Mudulus G' (in Pa) and the Loss Modulus G"(in Pa) versus the frequency in a frequency sweep for some balancing gel compositions of the invention described in Table 1. Frequency sweep 100-0.1 Hz, 10 or 5 Pa stress (stress within Linear Visco-Elastic region). Arrows indicate crossover frequency.

The relationship between G' and G" as measured in a frequency sweep is a structural Characterization of a material. Typical frequency sweep curves for a series of well working balancing compositions are shown in FIG. 4. The "Cross Over Frequency", i.e. the frequency at which G" becomes greater than G' should be in the range 10-40 Hz. A very satisfactory balancing composition has a cross over frequency value around 16 Hz. Typical stress growth sweeps for two functional balancing compositions are shown in FIG. 5. A very satisfactory balancing gel has a Yield Stress of about 30 Pa.

Of equal importance as the visco-elastic properties is the long term stability in service of the balancing gel, the performance at various temperatures of the gel, and the chemical inertness of the gel.

An acceptable tyre balancing gel must remain functional during the life time of the tyre and under the various driving conditions, in particular it must remain functional within the normal driving speed interval, 0 to approximate 160 KMH, and within the normal temperature range, −30° C. to +90° C., experienced in service.

Furthermore, the tyre balancing gel must not have any harmful effect on the tyre, in particular it should not affect the inner lining of the tyre or cause any damage to the cord or other tyre parts if it accidentally reaches such parts (i.e. by puncture of the tyre).

MINIMUM CRITERIA FOR A FUNCTIONAL BALANCING GEL

Rheology: 1500 Pa<Storage Modulus (G')<5000 Pa.
Cross Over Frequency (G">G') 10-40 Hz.
Critical yield Stress>2 Pa.
Yield Stress>5 Pa
Volatility: Less than 6% (by weight) evaporation loss after 10 hours at 99° C.
Pour point of base liquid: <−15° C. (ASTM D97)
Separation stability: Less than 20% separation (by weight) of the base oil after 12 hours at 300 000×g and 25° C.
Chemical reactivity: No effect on rubber or other polymers, non-corrosive to metals.

As indicated above, the gels of the invention comprise two components, namely a base liquid and a gel former.

In the above formulas (I) and (II) for the base liquids, the square parentheses enclosing the propylene glycol and ethylene glycol moieties, respectively, are intended to denote that the monomer units of the copolymers may be present in the linear copolymer in any copolymer arrangement, such as random copolymers or block copolymers, random copolymers presently being preferred.

The copolymers of formula (I) are called alcohol initiated, and the copolymers of formula (II) are called diol initiated. The alkyl moiety R of the initiating alcohol may have 1-6 carbon atoms. Suitable examples are n-propanol, n-butanol, n-pentanol or n-hexanol. The alkylene moiety $R_1$ of the diol in question may be linear or branched and may have 2-8 carbons. Examples of the initiating diol may be ethylene glycol, propylene glycol, 1,3-propane diol, 1,3-butane diol, or 1,6-hexane diol.

It is preferred that the number average molecular weight of the glycol ether component(s) is/are in the range of 3000-10000.

In an embodiment of the invention, the ratio n:m of a copolymer of formula (I) is in the range from 40:60 to 75:26, such as from 40:60 to 60:40, in particular from 45:55 to 55:45, such as around 50:50. In another embodiment, the ratio n:m of a copolymer of formula (II) may be from 70:30 to 80:20, such as around 75:25.

In a preferred embodiment, the composition contains 6.3±0.2% w/w, more preferably 6.3±0.1%, of fumed silica gel former; and 1±0.3% w/w, preferably 1±0.2 w/w, more preferably 1±0.1% w/w of a copolymer of formula (II) having a ratio n:m from 70:30 to 80:20, more preferably around 75:25; and the balance being a copolymer of formula (I) having a ratio n:m from 45:55 to 55:45, such as around 50:50.

In another preferred embodiment, composition contains 6.5±0.2% w/w, more preferably 6.5±0.1%, of fumed silica gel former; and 1±0.3% w/w, preferably 1±0.2 w/w, more preferably 1±0.1% w/w of a copolymer of formula (II) having a ratio n:m from 70:30 to 80:20, more preferably around 75:25; and the balance being a copolymer of formula (II) having a ratio n:m from 45:55 to 55:45, such as around 50:50.

Examples of base liquids useful in the practice of the invention are:

UCON® 50-HB Fluids, which are alcohol-initiated random copolymers of ethylene oxide and propylene oxide containing equal amounts by weight of oxyethylene and oxypropylene groups. The 50-HB Series products are water soluble at temperatures below 40° C. and have one terminal hydroxyl group;

SYNALOX® 40 fluids (produced by Dow Chemical Company), which are water soluble, diol-initiated random copolymers of ethylene oxide and propylene oxide containing 40% by weight of oxyethylene and 60% by weight oxypropylene groups, and have two terminal hydroxyl groups;

SYNALOX® 50 fluids which are water soluble, diol-initiated random copolymers of ethylene oxide and propylene oxide containing 50% by weight of oxyethylene and 50% by weight oxypropylene groups, and have two terminal hydroxyl groups; and UCON® 75-H Fluids which are diol-initiated random copolymers of ethylene oxide and propylene oxide containing 75 weight percent oxyethylene and 25 weight percent oxypropylene groups. 75-H Series products are water soluble at temperatures below 75° C. and have two terminal hydroxyl groups.

Specific examples of base liquids useful in this invention are 1) a butanol-initiated random copolymer of ethylene oxide and propylene oxide containing equal amounts by weight of oxyethylene and oxypropylene groups with a numbered average molecular weight of 3930, viscosity 1100 cSt at 40° C. and ISO 3448 viscosity grade of 1000 available from DOW Chemical Corporation under the trade name UCON® 50-HB-5100, 2) a dial-initiated random copolymer of ethylene oxide and propylene oxide containing 40% by weight of oxyethylene and 60% by weight oxypropylene groups with a numbered average molecular weight of 5300, viscosity 1050 cSt at 40° C. and ISO 3448 viscosity grade of 1000 available from DOW Chemical Corporation under the trade name SYNALOX® 40-D700, 3) a dial-initiated random copolymer of ethylene oxide and propylene oxide containing 50% by weight of oxyethylene and 50% by weight oxypropylene groups with a kinematic viscosity of 960-1.160 mm2/@40° C. ASTM D445 available from DOW Chemical Corporation under the trade name SYNALOX® 50-D700 and 4) a dial-initiated random copolymer of ethylene oxide and propylene oxide containing 75 weight percent oxyethylene and 25 weight percent oxypropylene groups with a numbered average molecular weight of 6950 and viscosity 1800 cSt at 40° C. available from DOW Chemical Corporation under the trade name UCON® 75-H-9500.

The fumed silica gel former may be a hydrophilic type fumed silica having a BET surface area of from 50 to 400 $m^2/g$, such as 90 to 400 $m^2/g$, preferably from 200 to 300 $m^2/g$; or the fumed silica gel former may be a hydrophobized type fumed silica having has a BET surface area of from 50 to 300 $m^2/g$, preferably from 250 to 350 $m^2/g$; or mixtures of such hydrophilic and hydrophobized type fumed silica gel formers.

One of a gel former useful in the practice of the invention is a hydrophilic fumed silica having a BET surface of 300 $m^2/g$ available from EVONIK under the trade name Aerosil A300.

The gelling effect of the gel formers on the oils is accomplished by the formation of a network of the molecules of the gel former through hydrogen bonding via hydroxy groups or via van der Waals attraction between segments molecules of the gel former. The number and the strength of these bonds determines the gel strength, and the ability of the gel to support a load (critical yield stress).

The compositions of the invention are typically made by mixing together the ingredients, if necessary under slight heating to below 40° C.

USING THE COMPOSITIONS OF THE INVENTION

It is possible to balance tyres with the gels according to the present invention by simply applying a suitable amount of the gel to the inner lining of a tyre as is. However, since all parts of the gel must be interconnected, the whole surface of the "flat" part of the inner lining must be then gel covered, and gel in excess of the amount theoretically needed for balancing will have to be applied.

It has been determined that restriction of the gel to the shoulder areas of the inner lining of a tyre greatly increases the balancing efficiency of the gel and also drastically reduces the amount of gel needed for balancing.

Figure 1:
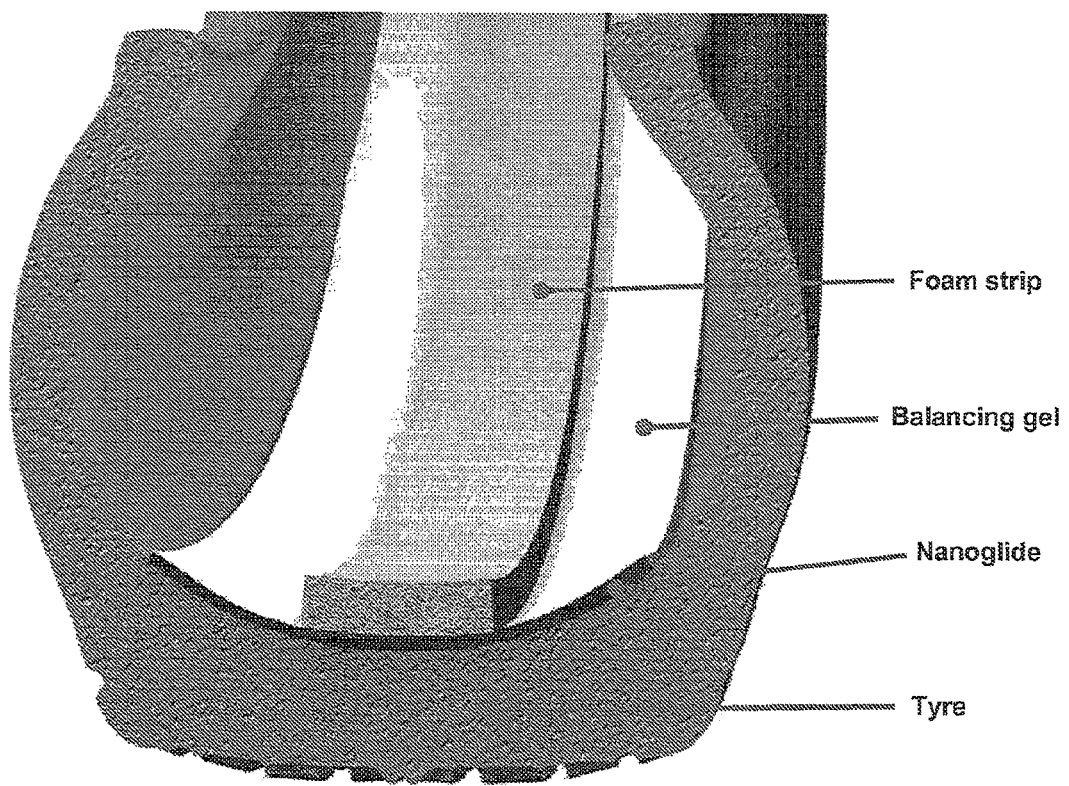
FIG. 1 shows a cross-section of tyre depicting a preferred arrangement of a balancing gel of the invention therein.

In one embodiment, this restriction of movement can be achieved by attaching a foam strip to the centre part of the inner lining (see FIG. 1). In a standard 245/45R18 tyre this foam strip is typically 100 mm wide and 5 mm thick. In another embodiment, the restriction can be achieved by attaching two separate strips of foam (10 mm high and 100 mm wide) near the shoulders of the tyre (see FIG. 1). The amount of gel applied as an even layer on each shoulder is 2×80 g (in contrast the more than 300 g of gel usually required to balance an unmodified tyre). Furthermore the shoulder area in contact with the composition may be treated with a friction reducing nano-coating.

All tests with gel balancing in the following were carried out on tyres with the inner lining modified in this manner.

EXAMPLES

Using base liquids and gel formers as described above, a series or exemplary balancing gels have been prepared, and their compositions are shown in Table 1 and Table 2

TABLE 1

GEL FORMULATIONS. BALANCING RESULTS IN ROAD AND BENCH TESTS. CENTRIFUGAL STABILITY

| Table I. FORMULA # COMPONENT | AEROSIL A300 | UCON 75-HB-9500 | UCON 50-HB-5100 | BALANCING Bench test* | BALANCING Road test** | CENTRIFUGAL STABILITY*** |
|---|---|---|---|---|---|---|
| 1 | 6 | 0.5 | 93.5 | - | 6 | + |
| 2 | 7 | 0.5 | 92.5 | - | 5 | + |
| 3 | 8 | 0.5 | 91.5 | - | 5 | + |
| 4 | 6 | 1 | 93 | + | 7 | + |
| 5 | 6.2 | 1 | 92.8 | + | 9 | + |
| 6 | 6.3 | 1 | 92.7 | + | 10 | + |
| 7 | 6.4 | 1 | 92.6 | + | 9 | + |
| 8 | 6.5 | 1 | 92.5 | + | 8 | + |
| 9 | 6.7 | 1 | 92.3 | + | 7 | + |
| 10 | 7 | 1 | 92 | - | 5 | + |
| 11 | 8 | 1 | 91 | - | 3 | + |
| 12 | 5 | 2 | 93 | + | 7 | + |
| 13 | 5.5 | 2 | 92.5 | + | 9 | + |
| 14 | 5.8 | 2 | 92.2 | + | 10 | + |
| 15 | 6 | 2 | 92 | + | 9 | + |
| 16 | 6.5 | 2 | 91.5 | + | 7 | + |
| 17 | 7 | 2 | 91 | - | 5 | + |

TABLE 1-continued

GEL FORMULATIONS. BALANCING RESULTS IN ROAD AND BENCH TESTS. CENTRIFUGAL STABILITY

| Table I. FORMULA # COMPONENT | AEROSIL A300 | UCON 75-HB-9500 | UCON 50-HB-5100 | BALANCING Bench test* | BALANCING Road test** | CENTRIFUGAL STABILITY*** |
|---|---|---|---|---|---|---|
| 18 | 8 | 2 | 90 | − | 4 | + |
| 19 | 5 | 3 | 92 | + | 8 | − |
| 20 | 5.5 | 3 | 91.5 | + | 10 | − |
| 21 | 5.8 | 3 | 91.2 | + | 8 | − |
| 22 | 6 | 3 | 91 | + | 7 | − |
| 23 | 6.5 | 3 | 90.5 | − | 5 | − |
| 24 | 7 | 3 | 90 | − | 4 | − |
| 25 | 5 | 5 | 90 | + | 10 | − |
| 26 | 5.5 | 5 | 89.5 | + | 8 | − |
| 27 | 5.8 | 5 | 89.2 | − | 7 | − |
| 28 | 6 | 5 | 89 | − | 6 | − |
| 29 | 6.5 | 5 | 88.5 | − | 5 | − |
| 30 | 7 | 5 | 88 | − | 4 | − |
| 31 | 5 | 10 | 85 | + | 10 | − |
| 32 | 5.5 | 10 | 84.5 | + | 8 | − |
| 33 | 5.8 | 10 | 84.2 | + | 7 | − |
| 34 | 6 | 10 | 84 | − | 6 | − |
| 35 | 6.5 | 10 | 83.5 | − | 5 | − |
| 36 | 7 | 10 | 83 | − | 4 | − |

*"+" comparable or better than metal, "−" inferior to metal weight balancing.
**7-10 Acceptable, <7 Not acceptable
***Acceptable = +; Not acceptable = −

TABLE 2

GEL FORMULATIONS. BALANCING RESULTS IN ROAD AND BENCH TESTS. CENTRIFUGAL STABILITY

| FORMULA # COMPONENT | AEROSIL A300 | UCON 75HB-9500 | SYNALOX D40-700 | SYNALOX D50-700 | BALANCING Bench test | BALANCING Road test | CENTRIFUGAL STABILITY |
|---|---|---|---|---|---|---|---|
| 1 | 7 | 0 | 93 | | − | 4 | + |
| 2 | 7 | 0.5 | 92.5 | | − | 5 | + |
| 3 | 7 | 1 | 92 | | + | 6 | + |
| 4 | 7 | 3 | 90 | | + | 8 | − |
| 5 | 7 | 5 | 88 | | + | 7 | − |
| 6 | 7 | 10 | 83 | | + | 7 | − |
| 7 | 6 | 0 | | 94 | − | 4 | + |
| 8 | 6 | 0.5 | | 93.5 | − | 4 | + |
| 9 | 6 | 1 | | 93 | + | 7 | + |
| 10 | 6.3 | 0 | | 93.7 | − | 4 | + |
| 11 | 6.3 | 0.1 | | 93.6 | − | 4 | + |
| 12 | 6.3 | 0.5 | | 93.2 | + | 5 | + |
| 13 | 6.3 | 1 | | 92.7 | + | 7 | + |
| 14 | 6.5 | 0 | | 93.5 | − | 4 | + |
| 15 | 6.5 | 0.5 | | 93 | + | 6 | + |
| 16 | 6.5 | 1 | | 92.5 | + | 9 | + |
| 17 | 6.5 | 2 | | 91.5 | + | 8 | − |
| 18 | 7 | 0 | | 93 | − | 4 | + |
| 19 | 7 | 0.5 | | 92.5 | + | 6 | + |
| 20 | 7 | 1 | | 92 | + | 6 | + |
| 21* | 7 | 93 | | | − | 4 | − |
| 22* | 6 | 94 | | | + | 4 | − |
| 23* | 5 | 95 | | | + | 4 | − |
| 24* | 4 | 96 | | | + | 7 | − |

"+" comparable or better than metal weights "−" inferior to metal weights
7-10 Acceptable <7 Not acceptable
Acceptable = + Not acceptable = −

*Solidifies below −10° C.

The resulting compositions were evaluated by rheometry with a computerized Bohlin VOR Rheometer System (from Bohlin Rheology, Lund, Sweden) and in bench tests as described below and in field test using passenger cars.

The car tyres were modified as described above and supplied with 2×85 g of the balancing gels by applying the gel to the shoulder areas of the inner perimeter of the tyre before mounting.

The efficacy of a composition was evaluated in the following manner:

Bench Test for Measuring Balancing Efficiency of Gels.

No matter what tyre balancing technique is used its efficiency ultimately is defined in terms of driving comfort, i.e. no vibrations or at least a tolerable level of vibrations in actual road tests. This obviously is a cumbersome method for quality control and sophisticated equipment has been developed for metal weight balancing of wheel-tyre assemblies that are all based on detection and compensation (with metal weights attached to the rim) of weight imbalance. The measurements are always carried out on wheel-tyre assemblies without load, and experience has shown that this procedure leads to the best possible reduction of weight imbalance induced vibrations in vehicle operation using rim attached metal weights.

This type of bench test equipment cannot be used to measure the efficiency of the gel balancing method or to determine the amount of gel to be used. The balancing gel inside a tyre is distributed in response to the actual vibrations in the wheel-tyre assembly. These vibrations are very different when operating under load (actual driving) than when operating without a load in testing equipment. Furthermore the distribution of balancing gel in an optimally del-balanced tyre usually does not lead to a wheel-tyre assembly with zero weight imbalance, and this residual weight imbalance cannot be related to the efficiency of the gel balancing.

Consequently, a bench test for measuring the balancing efficiency of gels has been devised. In this bench test the actual driving conditions are simulated as closely as possible. The set-up is basically a modification of the drum test equipment used in the tyre industry, i.e. a variable speed rotating drum with a diameter around 300 mm, a moveable arm with an axle for mounting the wheel-tyre assembly and a device that allows varying the load of the tyre on the drum through a spring-dampening device. Acceleration sensors are mounted on the axle that allow measurement of vibration levels. In the set-up, only vertical accelerations are measured. The vertical accelerations vary constantly between two extremes ("up" and "down" direction) and the average difference (in g equivalents) between these two extremes is used as a measure of the vibration level (MVA value).

In order to establish an acceptance standard for gel balance the vertical accelerations were measured as described above at various speeds (between 80 and 180 kilometre per hour) and loads (from 300 to 1000 N) for a large number of tyres balanced to zero with metal weights. The MVA values obtained in this manner are the bench marks used for determining the performance of the balancing gel and used firstly to optimize gel performance and secondly to optimize the amount of balancing gel used.

In Table 1 and 2 are shown the results of such experiments

The stability of the balancing gels under high g-stress was measured with an ultracentrifuge. A sample of the gel was subjected to ~300 000×g for 12 hours at 25° C. The oil that separated at the top of the sample in the centrifuge tube was decanted and weighed and the % oil loss (separation due to synresis) determined in this manner was used as a measure of the gel's stability under high g-stress.

From experience we know that an oil loss of less than 20% signifies that the gel will remain stable under the g-stress experienced in a tyre (<1500 g) From the results in Table 1 and 2 as well as from experiments with a large number of other gels prepared from various PAG's and combinations of PAG's using a number of different fumed silicas as gel formers we can draw the following general conclusions:

To satisfy the separation stability requirements
PAG MW>2000
PAG's or combinations of PAG gels for which 3/1>PAG EO:PO ratio>2/3
Hydrophobic fumed silica with a BET surface area >150

Gels that satisfy the separation stability requirements above all have a certain balancing effect. The optimum balancing effect was achieved using a hydrophobic fumed silica with a BET surface of 300 in a PAG with a EO:PO ratio of 1:1 with a 0.5-1% additive of a PAG with a EO:PO ratio of 3:1.

Preferred Embodiments of the Invention Include

1. A tire balancing gel composition comprising
1) 85 to 97% by weight of a glycol ether component comprising one or more ethylene/propylene glycol copolymer ethers of the general formula (I) or the general (II) or mixtures thereof.

wherein

R is hydrogen or an alkyl group of 2-8 carbon atoms;

Ri is an alkylene moiety of 2-8 carbon atoms in which the two substituents are not carried on the same carbon atom;

m is the mole percentage of propylene glycol in the ethylene/propylene glycol copolymer moiety or moieties;

and n is the mole percentage of ethylene glycol in the ethylene/propylene glycol copolymer moiety or moieties, wherein the ratio n:m is in the range from 35:65 to 80:20;

each glycol copolymer compound having a number average molecular weight in the range of 2000-10000; and 2) 3 to 15% by weight of a fumed silica gel former;

said balancing composition being visco-elastic and having a Storage Modulus (G') between 1500 Pa and 5000 Pa at 22° C., a Loss Modulus (G") smaller than the Storage Modulus up to a Cross Over Frequency of 10-40 Hz, and a Critical Yield Stress exceeding 2 Pa.

2. A tire balancing composition according to paragraph 1, wherein the number average molecular weight of the glycol ether component(s) is/are in the range of 3000-10000.

3. A tire balancing composition according to paragraph 1 or 2, wherein the ratio n:m is in the range from 35:65 to 80:20, preferably in the range from 40:60 to 75:26, in particular from 40:60 to 60:40.

4. A tire balancing composition according to paragraph 1, wherein the fumed silica gel former is a hydrophilic type fumed silica having a BET surface area of from 90 to 400 $m^2/g$, preferably from 200 to 300 $m^2/g$; or the fumed silica gel former is a hydrophobized type fumed silica having has a BET surface area of from 50 to 300 $m^2/g$, preferably from 250 to 350 $m^2/g$; or mixtures of such hydrophilic and hydrophobized type fumed silica gel formers.

5. A tire balancing composition according to any of paragraphs 1-3, wherein the glycol ether component(s) exhibit(s) a Viscosity Grade determined according to ISO3448 of above 500, preferably in the range of 800-1200.

6. An automobile tire containing within its air cavity a suitable amount of a balancing composition as defined in any of paragraphs 1-5.

7. An automobile wheel assembly comprising a wheel rim and a tire, said tire containing within its air cavity a suitable amount of a balancing composition as defined in any of paragraphs 1-5.

8. A method for balancing a motor vehicle wheel assembly, comprising applying to the inner surface of the tire a balancing composition according to any of paragraphs 1-5, mounting the wheel assembly on a motor vehicle and driving the motor vehicle for a distance sufficient to allow the balancing composition to balance the wheel assembly.

The invention claimed is:

1. A method for balancing tires having an air cavity comprising introducing a gel formulation onto the inner surface of a tire, wherein the gel composition consists essentially of:
  1) 93.3 to 94 weight-percent of a glycol ether component comprising a mixture of ethylene/propylene glycol copolymer ethers of the general formula (II):

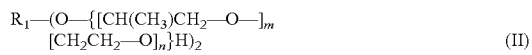

$R_1\text{—}(O\text{—}\{[CH(CH_3)CH_2\text{—}O\text{—}]_m[CH_2CH_2\text{—}O]_n\}H)_2$ (II)

wherein
  R is hydrogen or an alkyl group of 2-8 carbon atoms;
  $R_1$ is an alkylene moiety of 2-8 carbon atoms in which the two substituents are not carried on the same carbon atom;
  m is the mole percentage of propylene glycol in the ethylene/propylene glycol copolymer moiety or moieties; and
  n is the mole percentage of ethylene glycol in the ethylene/propylene glycol copolymer moiety or moieties, wherein the n:m ratio is in the range from 35:65 to 80:20;
  each glycol copolymer compound having a number average molecular weight in the range of 2000-10000; and
  2) a fumed silica gel former;
  said gel composition being visco-elastic and having a Storage Modulus (G') between 1500 Pa and 5000 Pa at 22° C., a Loss Modulus (G") smaller than the Storage Modulus up to a Cross Over Frequency of 10-40 Hz, and a Critical Yield Stress exceeding 2 Pa,
  wherein ethylene/propylene glycol copolymer ether of the general formula (II) having a n:m ratio from 70:30 to 80:20 is present in the composition in an amount of 1% by weight of the gel composition and the balance of the ethylene/-propylene glycol copolymer ether of the general formula (II) has a n:m ratio from 50:50 up to, but not including, 70:30 and
  the fumed silica gel former is present in the composition in an amount in the range from 6 to 6.7% by weight.

2. The method according to claim 1, wherein the number average molecular weight of the glycol ether component(s) is/are in the range of 3000-10000.

3. The method according to claim 2, wherein the fumed silica gel former is a hydrophilic type fumed silica having a BET surface area in the range from 200 to 300 m²/g; or the fumed silica gel former is a hydrophobized type fumed silica having a BET surface area in the range from 250 to 350 m²/g; or mixtures of such hydrophilic and hydrophobized type fumed silica gel formers.

4. The method according to claim 3, wherein the ethylene/propylene glycol copolymer ether of the general formula (II) having a n:m ratio from 70:30 to 80:20 is a random copolymer of ethylene oxide and propylene oxide containing 75% by weight oxyethylene and 25% by weight oxypropylene groups.

5. The method according to claim 4, wherein the fumed silica gel former is present in the gel composition in an amount of 6.5+/−0.2% by weight of the gel composition.

6. The method according to claim 1, wherein the fumed silica gel former is a hydrophilic type fumed silica having a BET surface area in the range from 200 to 300 m²/g; or the fumed silica gel former is a hydrophobized type fumed silica having a BET surface area in the range from 250 to 350 m²/g; or mixtures of such hydrophilic and hydrophobized type fumed silica gel formers.

7. The method according to claim 1, wherein the glycol ether component(s) exhibit(s) a Viscosity Grade determined according to ISO3448 in the range from 800 to 1200.

8. The method according to claim 1, wherein the ethylene/propylene glycol copolymer ether of the general formula (II) having a n:m ratio from 70:30 to 80:20 is a random copolymer of ethylene oxide and propylene oxide containing 75% by weight oxyethylene and 25% by weight oxypropylene groups.

9. The method according to claim 1, wherein the fumed silica gel former is present in the gel composition in an amount of 6.5+/−0.2% by weight of the gel composition.

* * * * *